(12) United States Patent
Hashimoto

(10) Patent No.: US 9,419,922 B2
(45) Date of Patent: Aug. 16, 2016

(54) INFORMATION PROCESSING APPARATUS AND TIME-LIMIT DISPLAY METHOD

(75) Inventor: Hitoshi Hashimoto, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 307 days.

(21) Appl. No.: 13/614,148

(22) Filed: Sep. 13, 2012

(65) Prior Publication Data
US 2013/0007168 A1 Jan. 3, 2013

Related U.S. Application Data

(63) Continuation of application No. PCT/JP2010/055659, filed on Mar. 30, 2010.

(51) Int. Cl.
G06F 15/16 (2006.01)
H04L 12/58 (2006.01)

(52) U.S. Cl.
CPC .................................. H04L 51/02 (2013.01)

(58) Field of Classification Search
CPC .................................. G06F 3/14; G06F 15/16
USPC ................................................... 709/206
See application file for complete search history.

(56) References Cited

U.S. PATENT DOCUMENTS

| | | | |
|---|---|---|---|
| 5,999,932 A * | 12/1999 | Paul | |
| 6,775,690 B1 * | 8/2004 | Creswell et al. | 709/206 |
| 2002/0051221 A1 | 5/2002 | Wakabayashi | |
| 2005/0108336 A1 * | 5/2005 | Naick et al. | 709/206 |
| 2007/0168434 A1 * | 7/2007 | Accapadi | G06Q 10/10 709/206 |
| 2010/0217818 A1 * | 8/2010 | Wu | H04L 12/58 709/206 |

FOREIGN PATENT DOCUMENTS

| | | |
|---|---|---|
| JP | 7-162452 | 6/1995 |
| JP | 7-183912 | 7/1995 |
| JP | 8-97850 | 4/1996 |
| JP | 10-136010 | 5/1998 |
| JP | 2002-49564 | 2/2002 |
| JP | 2003-264667 | 9/2003 |
| JP | 2005-284475 | 10/2005 |
| JP | 2009-135855 | 6/2009 |

OTHER PUBLICATIONS

International Search Report of Corresponding PCT Application PCT/JP2010/055659 mailed Jun. 8, 2010.
Japanese Office Action mailed Aug. 13, 2013 in corresponding Japanese Application No. 2012-507945.
English Translation of the International Preliminary Report on Patentability issued Nov. 1, 2012 in corresponding International Patent Application No. PCT/JP2010/055659.

* cited by examiner

Primary Examiner — David Lazaro
Assistant Examiner — Zia Khurshid
(74) Attorney, Agent, or Firm — Staas & Halsey LLP

(57) ABSTRACT

An information processing apparatus including: a processor to receive data transmitted via an electronic mail; to detect time-limit information representing a reply time-limit of the electronic mail from the received data; to display the electronic mail; and to display the reply time-limit in the way of being associated with the displayed electronic mail on the basis of the time-limit information and the present date-time.

13 Claims, 19 Drawing Sheets

FIG.4

| TIME-LIMIT INFORMATION ID | SENDER ID | MAIL ID | REPLY TIME-LIMIT | NOTIFICATION TIMING | UNOPENED MAIL NOTIFICATION TIMING |
|---|---|---|---|---|---|
| 001 | 105 | 005 | 2009/12/05 | APPOINTED DAY | - |
| 002 | 042 | 006 | 2009/12/06 | APPOINTED DAY | ONE DAY BEFORE |
| 003 | 066 | 007 | 2009/12/04 | ONE DAY BEFORE | - |
| ... | ... | ... | ... | ... | ... |

FIG.5

| MAIL ID | TRANSMISSION DATE-TIME | SUBJECT | TEXT | SOURCE ADDRESS | OPEN FLAG |
|---|---|---|---|---|---|
| 005 | 2009/12/01 | UNTITLED | ... | kahori@abc.ne.jp | YES |
| 006 | 2009/12/02 | SUMMARY OF GRADUATION TRIP | ... | souta@efg.co.jp | NO |
| 007 | 2009/12/03 | SYMPOSIUM TO BE HELD | ... | maho@hij.com | YES |
| 008 | 2009/12/05 | ABOUT DELIVERY | ... | tarou@klm.ne.jp | NO |
| ... | ... | | ... | ... | ... |

532

INFORMATION PROCESSING APPARATUS AND TIME-LIMIT DISPLAY METHOD

CROSS-REFERENCE TO RELATED APPLICATION

This is a continuation of Application PCT/JP2010/055659, filed on Mar. 30, 2010, now pending, the contents of which are herein wholly incorporated by reference.

FIELD

The present embodiments relates to an information processing apparatus, a time-limit display program and a time-limit display method, which display time-limit information.

BACKGROUND

Electronic mails (e-mails) are continually transmitted and received via a network such as the Internet. With an increased frequency of making business communications and notifications via the e-mails, a quantity of the e-mails received by the individuals rises at a dramatic rate. While on the other hand, some of the communications and the notifications via the e-mails request a reply to the received communication or notification within a designated time-limit. Under such circumstances, a recipient of the e-mail might misapprehend a designated reply time-limit. Further, the e-mail requested to reply might be intermingled with other e-mails, resulting in failing to reply within the designated reply time-limit.

Over the recent years, there has been known a technique of attaching, to the e-mail, a flag for knowing the recipient that a sender is important or special in order to assist management of the e-mails.

[Patent document 1] Japanese Laid-Open Patent Publication No. 07-162452
[Patent document 2] Japanese Laid-Open Patent Publication No. 2009-135855
[Patent document 3] Japanese Laid-Open Patent Publication No. 07-183912
[Patent document 4] Japanese Laid-Open Patent Publication No. 10-136010

SUMMARY

According to the technique of attaching the flag to the e-mail as described above, the recipient can recognize that the received mail is important or special. On the other hand, however, the recipient needs to gasp the reply time-limit designated in the received e-mail by himself or herself. Namely, the recipient needs to manage the reply time-limit of the e-mail by himself or herself.

An information processing apparatus comprising: a processor to receive data transmitted via an electronic mail; to detect time-limit information representing a reply time-limit of the electronic mail from the received data; to display the electronic mail; and to display the reply time-limit in the way of being associated with the displayed electronic mail on the basis of the time-limit information and the present date-time.

The object and advantages of the embodiment will be realized and attained by means of the elements and combinations particularly pointed out in the claims. It is to be understood that both the foregoing general description and the following detailed description are exemplary and explanatory and are not restrictive of the embodiment, as claimed.

BRIEF DESCRIPTION OF THE DRAWINGS

FIG. 4 is a diagram depicting a time-limit database possessed by the information processing apparatus in the first embodiment.

FIG. 5 is a diagram depicting a mail database possessed by the information processing apparatus in the first embodiment.

DESCRIPTION OF EMBODIMENTS

Figure 1:
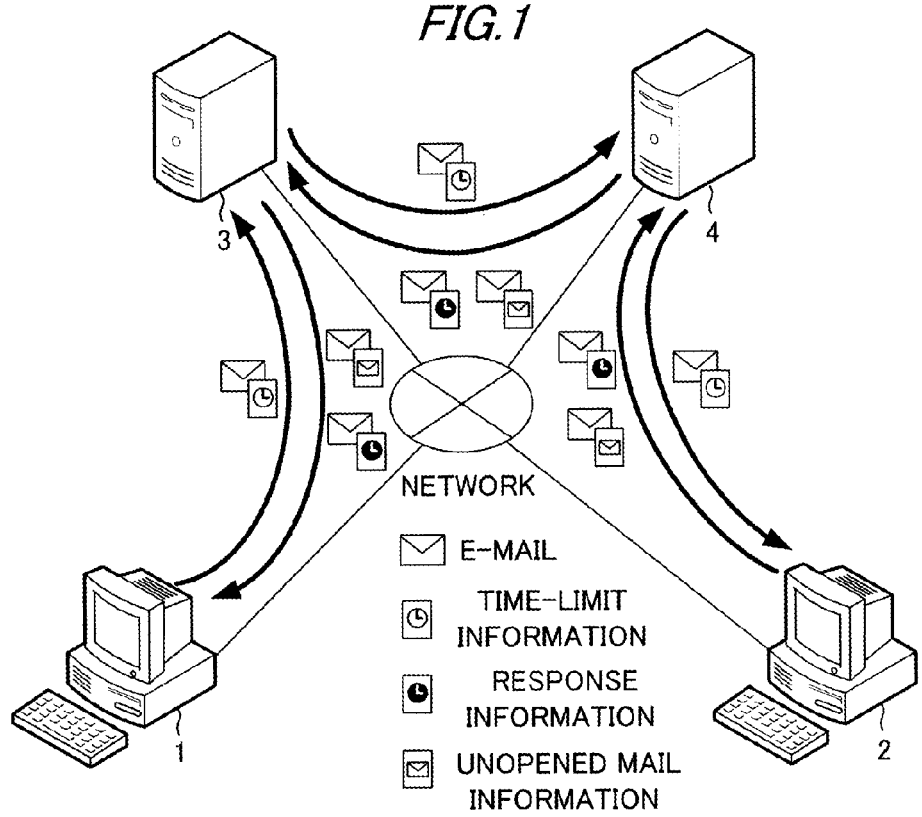
FIG. 1 is a schematic view illustrating an architecture of an e-mail system and whole operations thereof according to a first embodiment.

The embodiments of the present invention will hereinafter be described with reference to the drawing.

(First Embodiment)

To start with, an architecture of an electronic mail (e-mail) system according to a first embodiment will hereinafter be described with reference to FIG. 1.

The e-mail system includes an information processing apparatus 1, an information processing apparatus 2, a mail server 3 and a mail server 4, which are connected to a network. The information processing apparatus 1 is exemplified by a desktop personal computer and a notebook personal computer. The information processing apparatus 1 is capable of transmitting and receiving e-mails to and from other information processing apparatuses via the network. The information processing apparatus 2 is the personal computer similarly to the information processing apparatus 1. The information processing apparatus 2 is capable of transmitting and receiving the e-mails to and from other information processing apparatuses via the network. The mail server 3 transmits the e-mail transmitted by the information processing apparatus 1 to another mail server according to a destination of the e-mail. The mail server 3 receives the e-mail of which a destination is specified (addressed) to the information processing apparatus 1 from another mail server and delivers this e-mail to the information processing apparatus 1. The mail server 4 transmits the e-mail transmitted by the information processing apparatus 2 to another mail server according to a destination of the e-mail. The mail server 4 receives the e-mail of which a destination is specified to the information processing apparatus 2 from another mail server and delivers this e-mail to the information processing apparatus 2.

In the first embodiment, for the sake of the explanation, the information processing apparatus 1 (a first information processing apparatus) is treated as a source (sender) of the e-mail in which a reply time-limit is set, while the information processing apparatus 2 (a second information processing apparatus) is treated as a destination (recipient) of the e-mail in which the reply time-limit is set. The information processing apparatus 1 transmits the e-mail attached with time-limit information indicating the reply time-limit to the information processing apparatus 2. The information processing apparatus 2 presents the reply time-limit to a user on the basis of the time-limit information, and transmits the e-mail attached with response information representing a purport of having a function of notifying of the reply time-limit on the basis of the time-limit information to the information processing apparatus 1. Further, the information processing apparatus 2 transmits, to the information processing apparatus 1, the e-mail attached with unopened mail information representing that the e-mail attached with the time-limit information is not yet opened. The information processing apparatus, the time-limit display program and the time-limit display method enable the recipient to visually recognize the reply time-limit of the e-mail.

Figure 2:
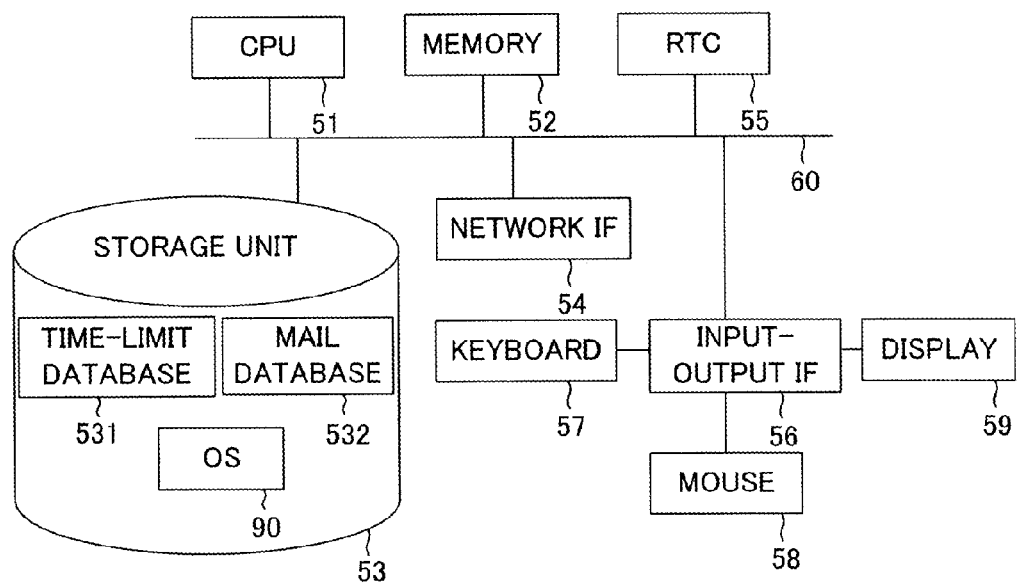
FIG. 2 is a diagram illustrating a hardware configuration of an information processing apparatus included in the e-mail system in the first embodiment.

Next, a hardware configuration of the information processing apparatus 1 according to the first embodiment will hereinafter be described with reference to FIG. 2.

The information processing apparatus 1 includes a CPU 51, a memory 52, a storage unit 53, a network IF (Interface) 54, a RTC (Real Time Clock) 55, an input-output IF 56, a keyboard 57, a mouse 58 and a display 59. An assumption is that the CPU 51, the memory 52, the storage unit 53, the network IF 54, the RTC 55 and the input-output IF 56 are connected to each other via a bus 60. The storage unit 53 gets stored with an OS (operating System) 90, a time-limit database and a mail database that will be described later on. The network IF 54 is an interface for establishing a connection with the network and is exemplified such as a network card. The RTC 55 always counts the set time irrespective of when supplying a power source to the information processing apparatus 1 and when cutting off the power source from the information processing apparatus 1. Herein, the RTC 55 retains respective items of information of year, month, day, hour, minute and second as time data. The input-output IF 56 accepts inputs of the keyboard 57 and the mouse 58, and outputs a screen image to the display 59. The keyboard 57 is an input device on which a plurality of keys to which characters and specified functions are allocated is arrayed. The mouse 58 is a pointing device for designating a specified position on the display 59. The display 59 is an output device and outputs, as the screen image, a GUI (Graphical User Interface) of the OS 90 and an application running on the OS 90. Note that a hardware configuration of the information processing apparatus 2 is the same as the configuration of the information processing apparatus 1 described above, and hence its description is omitted. Incidentally, in the first embodiment, in each of the mail servers 3 and 4, the storage unit 53 thereof retains neither the time-limit database 531 nor the mail database 532.

Figure 3:
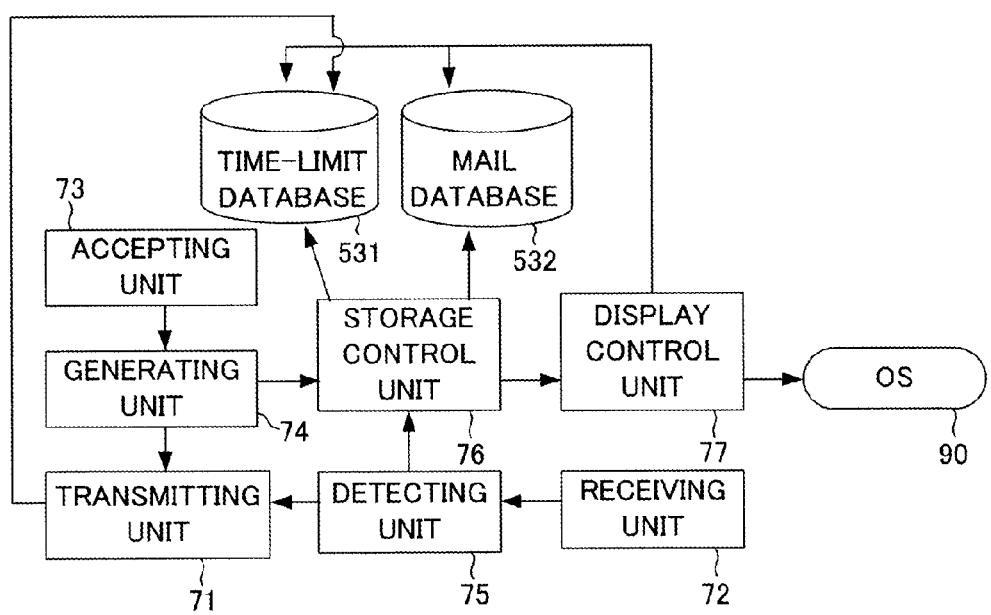
FIG. 3 is a diagram illustrating a functional configuration of the information processing apparatus included in the e-mail system in the first embodiment.

Next, a functional configuration of the information processing apparatus 1 according to the first embodiment will hereinafter be described with reference to FIG. 3.

The information processing apparatus 1 includes, as functions, a transmitting unit 71, a receiving unit 72, an accepting unit 73, a generating unit 74, a detecting unit 75, a storage control unit 76 and a display control unit 77. The CPU 51 and the memory 52 cooperate to realize these functions.

The transmitting unit 71 transmits the e-mail. The receiving unit 72 receives the e-mail and the data transmitted by use of the e-mail. The accepting unit 73 accepts an instruction about setting the time-limit of the e-mail. The generating unit 74 generates the time-limit information based on the instruction accepted by the accepting unit 73. The detecting unit 75 detects the time-limit information, notification information and response information from the data received by the receiving unit 72. To be specific, the detecting unit 75 determines whether the received data contains these items of information or not, and, if contained, extract these items of data (information). The storage control unit 76 adds the e-mail received by the receiving unit 72 to the mail database 532, and adds the time-limit information detected by the detecting unit 75 to the time-limit database 531. The display control unit 77 displays the e-mail stored in the storage unit 53 on the display 59. Further, the display control unit 77 reads the time-limit information associated with the displayed e-mail from the storage unit 53. Moreover, the display control unit 77 displays, on the display 59, the reply time-limit based on the readout time-limit information in the way of its being associated with the displayed e-mail on the basis of the readout time-limit information and the present date-time. Note that the functional configuration of the information processing apparatus 2 is the same as the configuration of the information processing apparatus 1.

Next, the time-limit database and the mail database will hereinafter be described with reference to FIGS. 4 and 5. Herein, the time-limit database 531 depicted in FIG. 4 and the mail database 532 illustrated in FIG. 5 are stored in the storage unit of the information processing apparatus 2 defined as the destination (recipient) of the e-mail with the reply time-limit in the first embodiment.

To being with, the time-limit database 531 will be explained. As illustrated in FIG. 4, in the time-limit database 531, a time-limit information ID, a sender ID, a mail ID, a reply time-limit, a notification timing and a unopened mail notification timing are associated with each other. The time-limit information ID is a unique identifier in the time-limit database 531, this identifier being added when the time-limit information is added to the time-limit database 531. The sender ID is a unique identifier in the information processing apparatus 1 defined as the sender of the e-mail with the reply time-limit, this identifier being generated by the generating unit 74 and added to the time-limit information. The mail ID is a unique identifier in the mail database 532, this identifier being added when the mail information is added to the mail database 532 and specifying the e-mail attached with the time-limit information. The reply time-limit represents a reply time-limit set in the information processing apparatus 1. The notification timing represents a timing, set in the information processing apparatus 1, for notifying the information processing apparatus 2 of the reply time-limit. The unopened mail notification timing represents a timing, set in the information processing apparatus 1, if the e-mail with the reply time-limit is still unopened in the information processing apparatus 2, for notifying the information processing apparatus 1 of this purport. Note that one row corresponds to one record of time-limit information in the time-limit database 531 illustrated in FIG. 4. Note that the time-limit information is to be text data attached to the e-mail in the first embodiment. Further, the time-limit information is to be detected as the time-limit information at the destination (recipient) by use of a special character string for a header or a file name. The time-limit information is set as the attached file, thereby enabling the e-mail to be opened without any problem even when the destination (recipient) cannot recognize the time-limit information. Moreover, the time-limit information is set as the text data, thereby enabling the destination user to refer to the reply time-limit by opening the text even when the destination cannot recognize the time-limit information.

Next, the mail database 532 will hereinafter be described. As depicted in FIG. 5, in the mail database 532, a mail ID, a transmission date-time, a subject, a text, a source address and an open flag are associated with each other. The transmission date-time is a date-time when the e-mail sender transmits the e-mail. The subject and the text represent a content of a message of the e-mail. The source address is an e-mail address of the sender. The open flag, which represents an opened status of the e-mail, indicates being opened in the case of "ON" but indicates not being opened in the case of "OFF". Similarly to the time-limit database 531, one row corresponds to one record of the e-mail in the mail database 532 illustrated in FIG. 5.

Next, the operations of the information processing apparatus which transmits the e-mail with the reply time-limit will hereinafter be described with reference to FIGS. 6 and 7.

Figure 6:
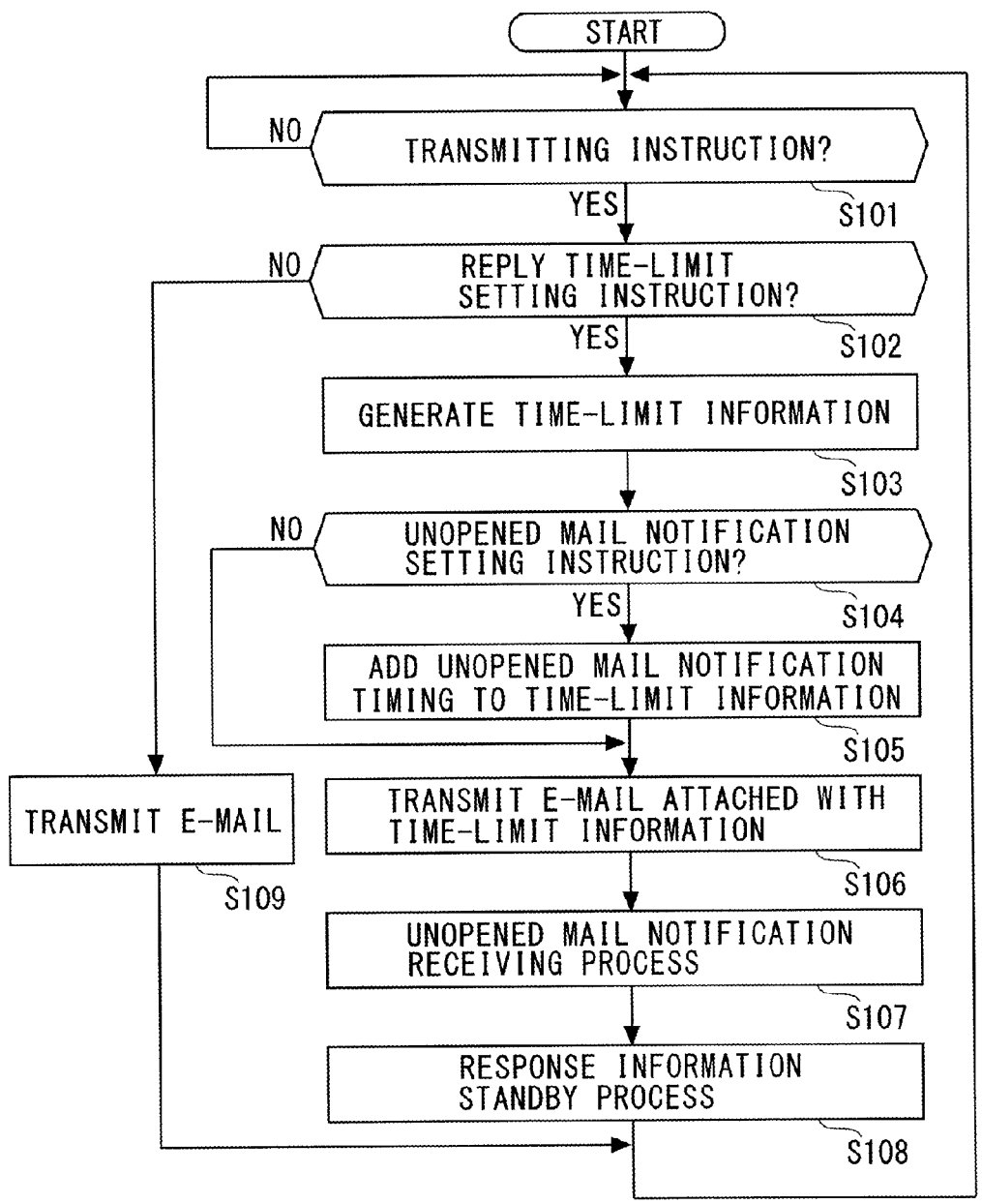
FIG. 6 is a flowchart illustrating an operation of the information processing apparatus which transmits the e-mail with a reply time-limit in the first embodiment.
Figure 7:
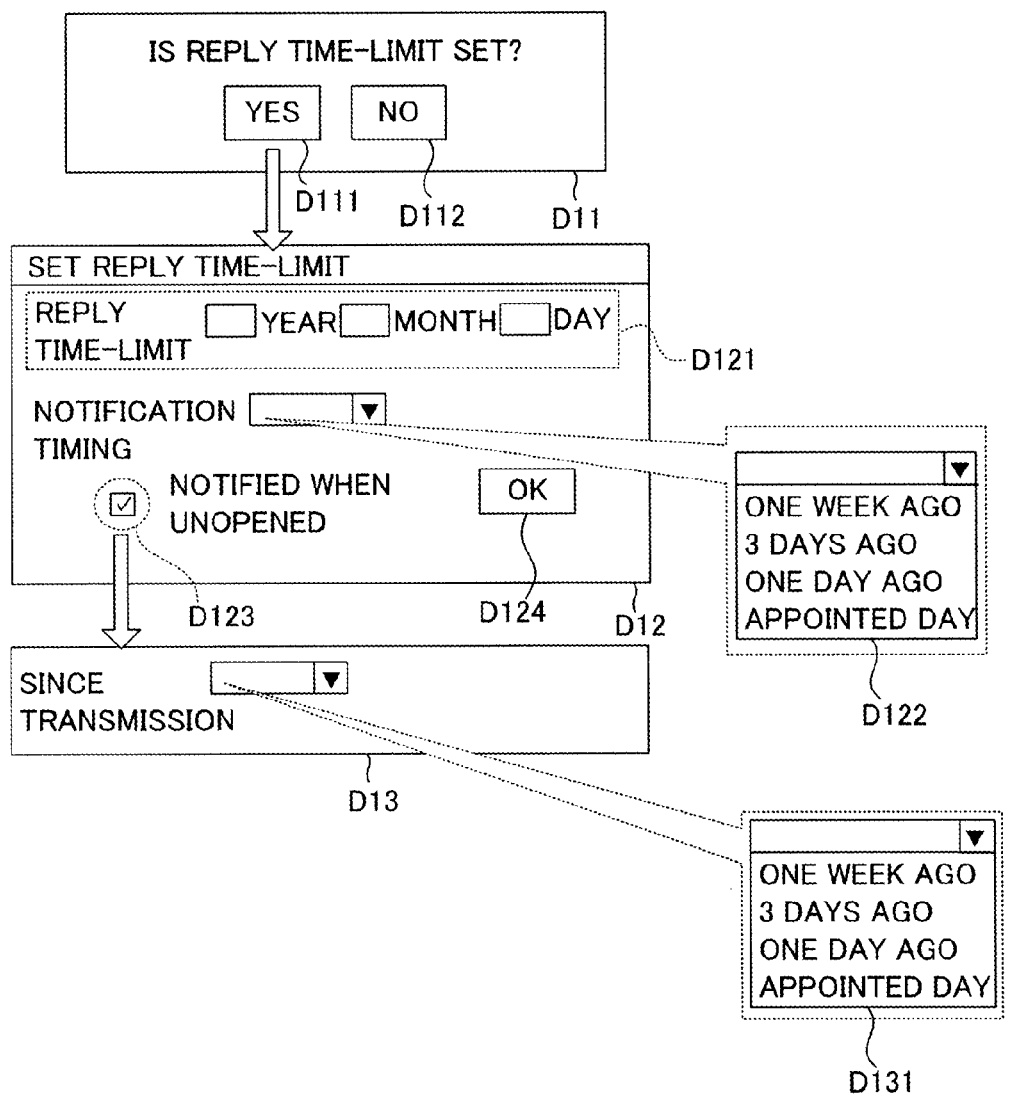
FIG. 7 is an explanatory diagram of a method of setting notification timing of the reply time-limit and notification timing when unopened in the first embodiment.

As illustrated in FIG. 6, at first, the accepting unit 73 determines whether or not the user gives an instruction of transmitting the e-mail (step S101).

If the e-mail transmitting instruction is given (step S101, YES), the accepting unit 73 determines whether or not the user gives an instruction of setting the reply time-limit in the e-mail to be transmitted (step S102). This determination is made, as illustrated in FIG. 7, based on an input to a dialog box D11 and an input to a dialog box D12 each displayed on the display 59 of the information processing apparatus 1. Specifically, in the dialog box D11, a selection button D111 is selected, the reply time-limit is inputted to an input form D121, the notification timing is selected in a selection form D122, and a selection button D124 is selected, from which status it is determined that the instruction of setting the reply time-limit is given. On the other hand, a selection button D112 is selected in the dialog box D11, form which status the accepting unit 73 determines that the instruction of setting the reply time-limit is given.

If the user gives the instruction of setting the reply time-limit (step S102, YES), the generating unit 74 generates the time-limit information attached to the e-mail to be transmitted on the basis of the input to the input form D121 and the selected items in the selection form D122 (step S103). Next, the accepting unit 73 determines whether or not the user gives an instruction of setting the notification when unopened (step S104). This determination is made based on whether a check box D123 in the dialog box D12 is checkmarked or not. To be specific, if the selection button D124 is selected in a checkmarked status of the check box D123, the accepting unit 73 determines that the notification setting when unopened is done. Note that when the check box D123 is checkmarked, a dialog box D13 containing a selection form D131 for selecting an unopened mail notification timing is displayed. In the case of putting the checkmark in the check box D123, it is assumed that the selection button D124 is selectable only in a status of selecting any one of the items in the selection form D131. Whereas if the selection button D124 is selected in a status of not putting the checkmark in the check box D123, the accepting unit 73 determines that the notification setting when unopened is not done. Note that the dialog boxes D11-D13 are to be displayed by the display control unit 77.

When the user gives the instruction of doing the notification setting when unopened (step S104, YES), the generating unit 74 adds the unopened mail notification timing to the time-limit information (step S105). Subsequently, the transmitting unit 71 transmits the e-mail attached with the time-limit information to the information processing apparatus 2 (step S106). Next, the detecting unit 75 and the display control unit 77 execute an unopened mail information receiving process that will be described later on (step S107). Subsequently, the detecting unit 75 and the display control unit 77 execute a response information receiving process that will be described later on (step S108). Next, the accepting unit 73 determines again whether the user gives the transmitting instruction of the e-mail or not (step S101).

Further, in step S104, if the user does not give the instruction of the notification setting when unopened (step S104, NO), the transmitting unit 71 transmits the e-mail attached with the time-limit information to the information processing apparatus 2 (step S106).

Furthermore, in step S102, if the user does not give the instruction of the reply time-limit setting (step S102, NO), the transmitting unit 71 transmits the e-mail not attached with the time-limit information to the information processing apparatus 2 (step S109). Next, the accepting unit 73 determines again whether or not the user gives the instruction of transmitting the e-mail (step S101).

Figure 8:
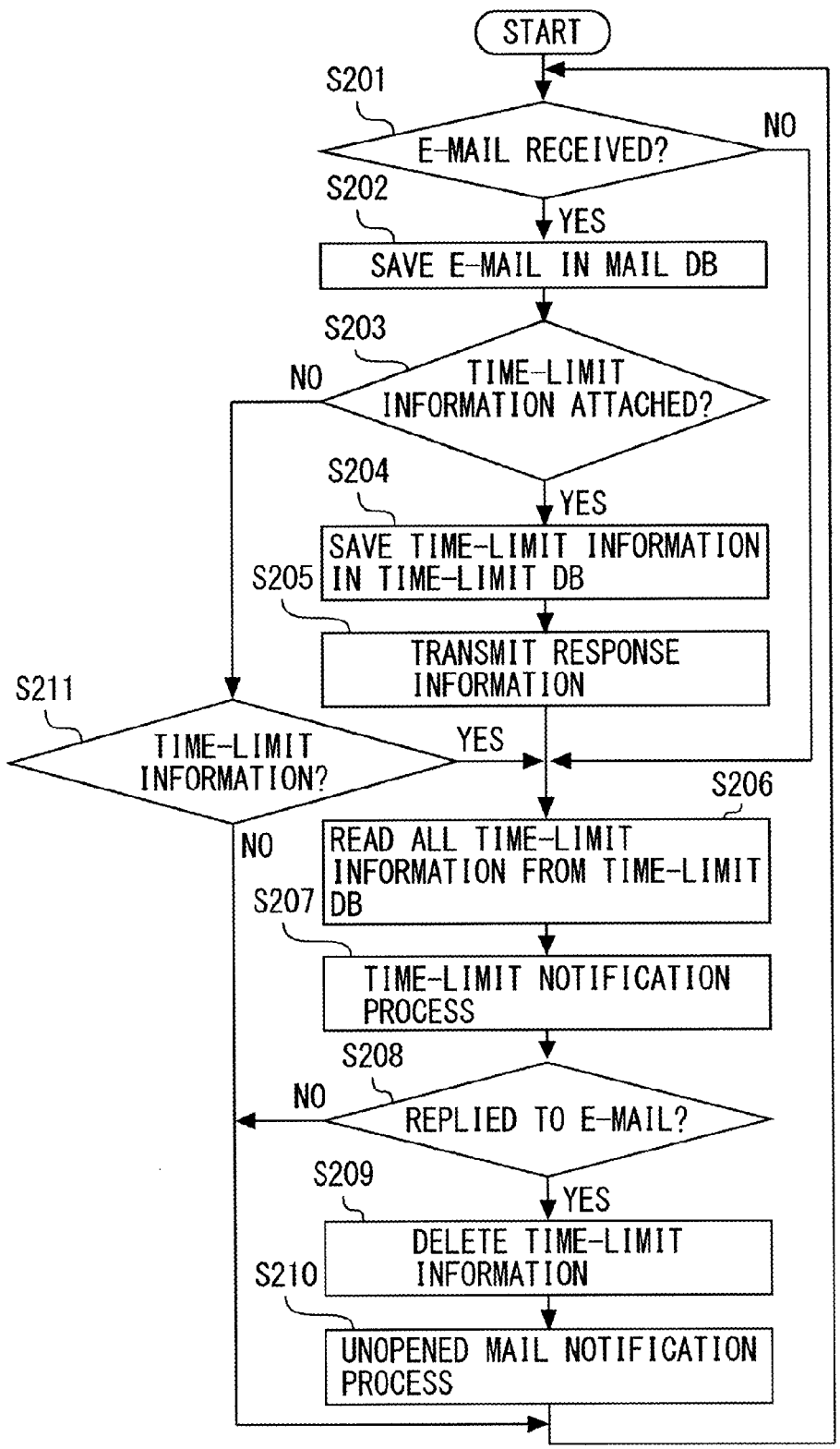
FIG. 8 is a flowchart illustrating an operation of the information processing apparatus which receives the e-mail with the reply time-limit in the first embodiment.

Subsequently, the operation of the information processing apparatus which receives the e-mail with the reply time-limit will hereinafter be described with reference to FIG. 8. This operation is performed by the information processing apparatus 2 in the first embodiment.

To begin with, the storage control unit 76 determines whether the receiving unit 72 receives the e-mail or not (step S201).

If the receiving unit 72 receives the e-mail (step S201, YES), the storage control unit 76 attaches a mail ID to the e-mail received by the receiving unit 72 and saves this e-mail in the mail database 532 (step S202). Next, the detecting unit 75 detects the time-limit information by determining whether the e-mail received by the receiving unit 72 is attached with the time-limit information or not (step S203).

If the received e-mail is attached with the time-limit information (step S203, YES), the storage control unit 76 detaches the time-limit information from the e-mail, then attaches the time-limit information ID and the mail ID attached to the mail information of the e-mail attached with this time-limit information to the time-limit information, and adds this time-limit information attached with the time-limit information ID and the mail ID to the time-limit database 531 (step S204). Next, the transmitting unit 71 transmits the e-mail attached with the response information to the information processing apparatus 1 (step S205). This response information is to contain the sender ID of the time-limit information.

Next, the display control unit 77 reads all the time-limit information from the time-limit database 531 (step S206). Subsequently, the display control unit 77 executes a time-limit display process that will be described later on (step S207). Next, the storage control unit 76 determines whether or not the transmitting unit 71 transmits back the e-mail with the reply time-limit (step S208).

If the e-mail with the reply time-limit is transmitted back (step S208, YES), the storage control unit 76 deletes the time-limit information associated with the e-mail transmitted back, i.e., the time-limit information having the mail ID of the e-mail transmitted back from the time-limit database 531 (step S209). Next, the transmitting unit 71 executes an unopened mail notification process that will be described afterward (step S210), and the storage control unit 76 again determines whether or not the receiving unit 72 receives the e-mail (step S201).

Whereas if the e-mail with the reply time-limit is not transmitted back (step S208, NO), the storage control unit 76 again determines whether or not the receiving unit 72 receives the e-mail (step S201).

Further, if it is determined in step S203 that the received e-mail is not attached with the time-limit information (step S203, NO), the storage control unit 76 determines whether the time-limit database 531 retains the time-limit information or not (step S211).

If the time-limit database 531 retains none of the time-limit information (step S211, NO), the storage control unit 76 again determines whether the receiving unit 72 receives the e-mail or not (step S201).

Whereas if the time-limit database 531 retains the time-limit information (step S211, YES), the display control unit 77 reads all the time-limit information from the time-limit database 531 (step S206).

Next, a time-limit display process will hereinafter be described with reference to FIGS. 9-11.

Figure 9:
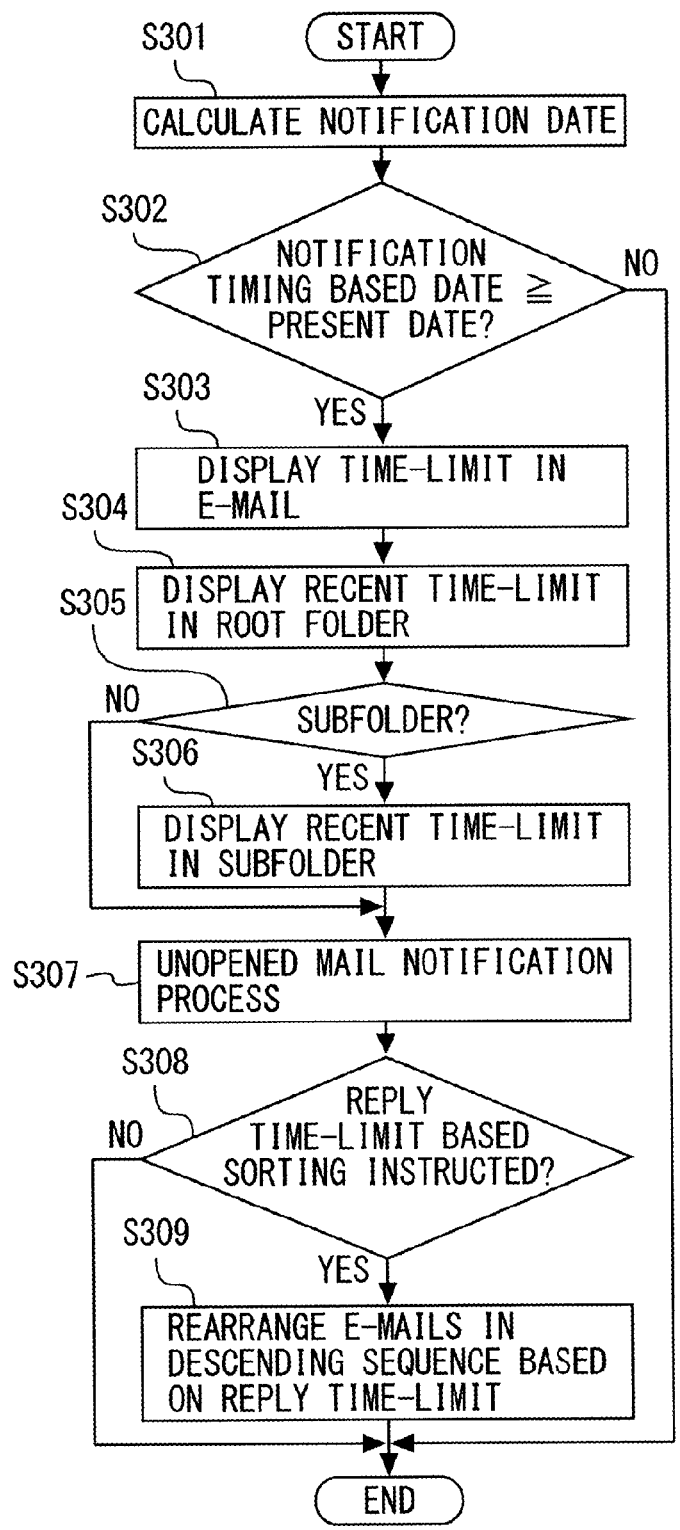
FIG. 9 is a flowchart illustrating an operation of a time-limit display process in the first embodiment.

As illustrated in FIG. 9, the display control unit 77 determines a notification date based on the reply time-limit and the notification timing in the time-limit information read from the time-limit database 531 (step S301). Herein, in the case of taking time-limit information having the time-limit information ID "003" in FIG. 4 for example, the notification date is "2009/12/03". Next, the display control unit 77 determines whether the notification date is from the present date onward with respect to the readout time-limit information or not (step S302). Herein, the display control unit 77 acquires the time counted by the RTC 55 as the present date-time via the OS 90.

Figure 10:
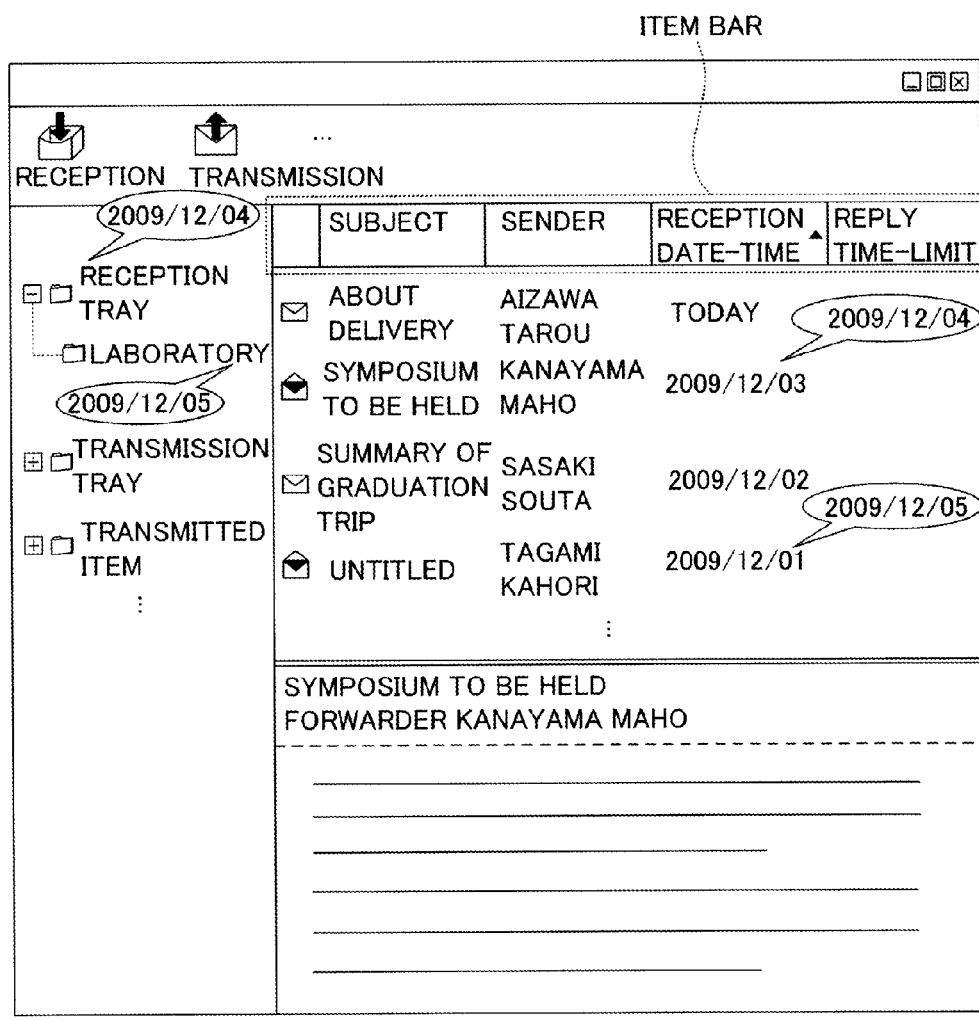
FIG. 10 is a diagram illustrating a displayed pop-up window for the reply time-limit in the first embodiment.

If the notification date of the readout time-limit information is from the present date onward (step S302, YES), as illustrated in FIG. 10, the display control unit 77 displays in a pop-up window the reply time-limit with respect to the e-mail associated with the time-limit information of which the notification date is from the present date onward (step S303). Note that "the display in the pop-up window with respect to the e-mail" implies that a screen image is displayed on a layer (window) in front of the window in which the e-mail is displayed. Further, "the e-mail associated with the time-limit information" is the e-mail having the mail ID attached to the time-limit information.

Figure 11:
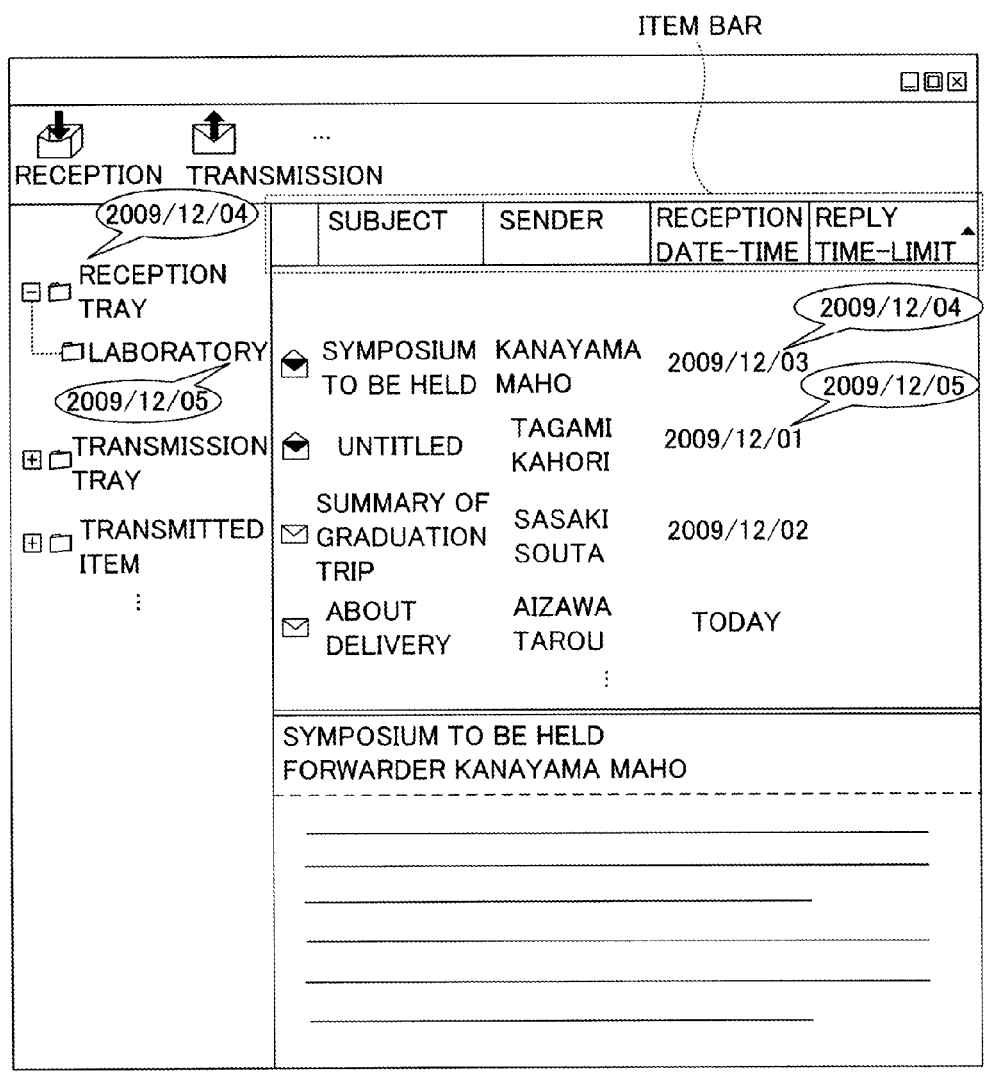
FIG. 11 is a diagram illustrating a window in which the e-mails are sorted out based on the reply time-limits in the first embodiment.

Next, the display control unit 77, as depicted in FIG. 11, displays in the pop-up window the reply time-limit nearest to the present date in the reply time-limits displayed in the pop-up window within a root folder stored with the e-mails.

Subsequently, the display control unit 77 determines whether a subfolder under the root folder is displayed or not (step S305).

If the subfolder is displayed (step S305, YES), the display control unit 77, as depicted in FIG. 11, displays in the pop-up window the reply time-limit nearest to the present date in the reply time-limits displayed in the pop-up window within the subfolder stored with the e-mails (step S306). Note that "the display in the pop-up window within the root folder or the subfolder" implies that the screen image is displayed on the layer in front of the window in which the root folder or the subfolder is displayed. Next, the transmitting unit 71 executes an unopened mail notification process that will be described later on (step S307). Subsequently, the accepting unit 73 determines whether a sorting instruction based on the reply time-limit is given or not (step S308). Herein, it is assumed that the sorting instruction based on the reply time-limit is given by clicking an item "reply time-limit" in an item bar.

If the sorting instruction based on the reply time-limit is given (step S308, YES), the display control unit 77, as illustrated in FIG. 11, rearranges the e-mails in a descending sequence base on the reply time-limit (step S309). Note that the e-mails may also be rearranged in an ascending sequence base on the reply time-limit.

Whereas if the sorting instruction based on the reply time-limit is not given (step S308, NO), the display control unit 77 finishes the time-limit display process.

Further, if it is determined in step S305 that the subfolder is not displayed (step S305, NO), the transmitting unit 71 executes the unopened mail notification process (step S307).

Moreover, if it is determined in step S302 that the notification date in the readout time-limit information is not from the present date onward (step S302, NO), the display control unit 77 finishes the time-limit display process.

As described above, the reply time-limit is displayed in the pop-up window on the basis of the reply time-limit and the notification timing, and the user is thus notified of the reply time-limit, whereby the user can recognize that the e-mail is close to the reply time-limit. Moreover, if there is a plurality of e-mails with the reply time-limits, the user can easily allocate priority levels to the e-mails that should be replied in the way of rearranging the e-mails on the basis of the added reply time-limits.

Figure 12:
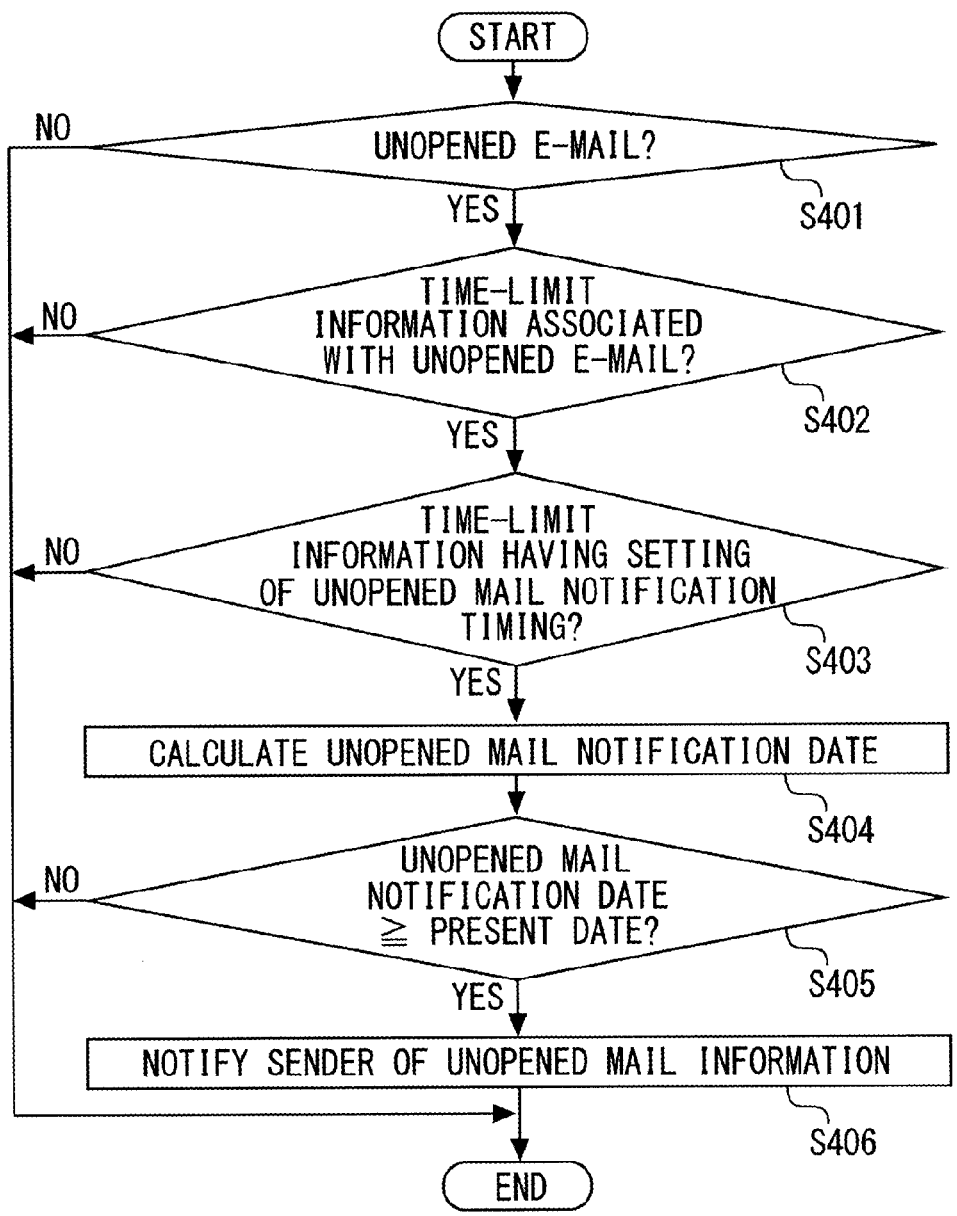
FIG. 12 is a flowchart illustrating an operation of an unopened mail notification process in the first embodiment.

Next, the unopened mail notification process will hereinafter be described with reference to FIG. 12.

At first, the transmitting unit 71 refers to the open flag in the mail database 532 and thus determines whether there is the unopened e-mail or not (step S401).

If the unopened e-mail exists (step S401, YES), the transmitting unit 71 determines whether or not the time-limit database 531 retains the time-limit information associated with the unopened e-mail (step S402).

If the time-limit information associated with the unopened e-mail exists (step S402, YES), the transmitting unit 71 determines whether or not the time-limit information undergoing the setting of the unopened mail notification timing is contained in the pieces of time-limit information associated with the unopened e-mails (step S403).

If the time-limit information undergoing the setting of the unopened mail notification timing exists (step S403, YES), the transmitting unit 71 determines the unopened mail notification date on the basis of the present date and the unopened mail notification timing with respect to each time-limit information (step S404). Next, the transmitting unit 71 determines whether or not the calculated unopened mail notification date is from the present date onward (step S405).

If the unopened mail notification date is from the present date onward (step S405, YES), the transmitting unit 71 notifies the sender of the unopened mail information (step S406). This unopened mail information is to contain at least the sender ID of the associated time-limit information.

Whereas if the unopened mail notification date is not from the present date onward (step S405, NO), the transmitting unit 71 terminates the unopened mail notification process.

If it is determined in step S403 that there is not any time-limit information undergoing the setting of the unopened mail notification timing (step S403, NO), the transmitting unit 71 finishes the unopened mail notification process. Further, if it is determined in step S402 that there is not the time-limit information associated with the unopened e-mail (step S402, NO), the transmitting unit 71 finishes the unopened mail notification process. Further, if it is determined in step S401 that there is no unopened e-mail (step S401, NO), the transmitting unit 71 finishes the unopened mail notification process.

Figure 13:
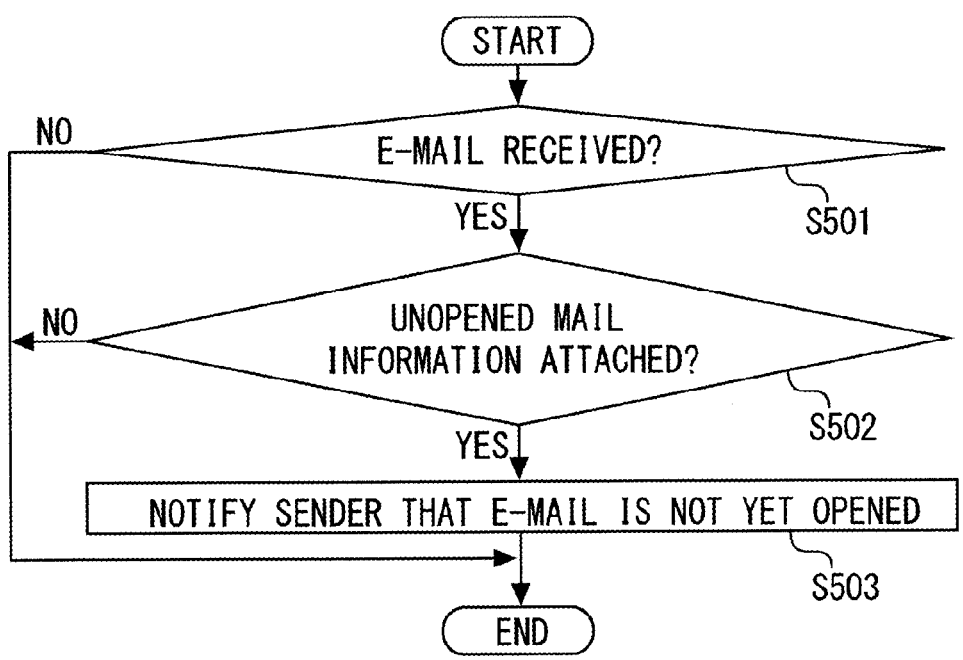
FIG. 13 is a flowchart illustrating an operation of an unopened mail information receiving process in the first embodiment.

Next, an unopened mail information receiving process will hereinafter be described with the reference to FIG. 13. This process is executed by the information processing apparatus 1 in the first embodiment.

At first, the detecting unit 75 determines whether the receiving unit 72 receives the e-mail or not (step S501).

If the e-mail is received (step S501, YES), the detecting unit 75 determines whether the unopened mail information is attached to the received e-mail or not (step S502).

If the unopened mail information is attached to the received e-mail (step S502, YES), the display control unit 77 notifies the user that the already-transmitted e-mail attached with the time-limit information associated with the sender ID in the unopened mail information is not yet opened (step S503). A notifying method is exemplified by a method of displaying a dialog box containing a description of a purport that the already-transmitted e-mail attached with the time-limit information is not yet opened, however, whatever method may be adopted as the notifying method.

Whereas if the unopened mail information is not attached to the received e-mail (step S502, NO), the detecting unit 75 finishes the unopened mail notification process. If it is determined in step S501 that the e-mail is not received (step S501, NO), the detecting unit 75 finishes the unopened mail notification display process.

Thus, the user is notified that the already-transmitted e-mail attached with the time-limit information is not yet opened and is thereby enabled to know that the transmission partner (the mail recipient) does not open the e-mail.

Figure 14:
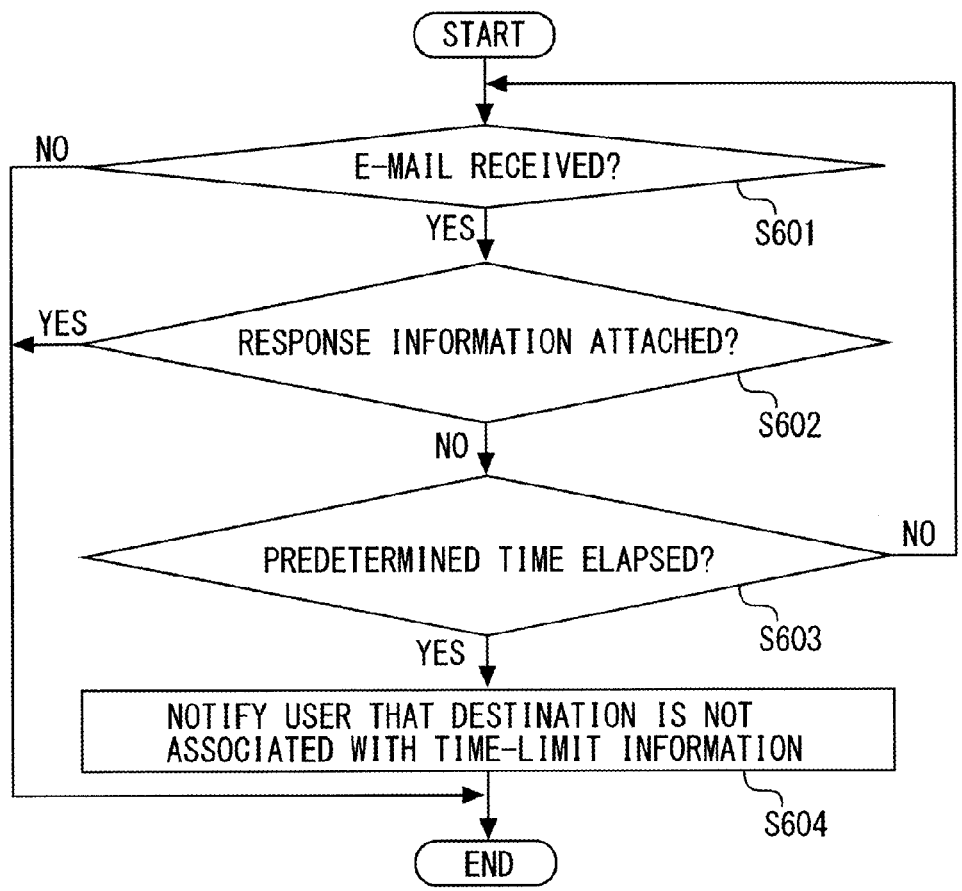
FIG. 14 is a flowchart illustrating an operation of a response information receiving process in the first embodiment.

Subsequently, a response information receiving process will hereinafter be described with reference to FIG. 14. This process is executed by the information processing apparatus 1 in the first embodiment.

To start with, the detecting unit 75 determines whether or not the receiving unit 72 receives the e-mail (step S601). If the e-mail is received (step S601, YES), the detecting unit 75 determines whether or not the response information is attached to the received mail (step S602). If the response information is not attached to the received mail (step S602, NO), the detecting unit determines whether or not a predetermined period of time elapses since the e-mail attached with the time-limit information has been transmitted (step S603).

If the predetermined period of time elapses since the e-mail attached with the time-limit information has been transmitted (step S603, YES), the display control unit 77 notifies the user that the destination is not associated with the time-limit information (step S604). Herein, a notifying method is exemplified by a method of displaying a dialog box containing a description of a purport that the destination is not associated with the time-limit information, however, whatever method may be adopted as the notifying method.

Whereas if the predetermined period of time does not elapse since the e-mail attached with the time-limit information has been transmitted (step S603, NO), the detecting unit 75 again determines whether the receiving unit 72 receives the e-mail or not (step S601). Further, it is determined in step S602 that the response information is attached to the received e-mail (step S602, YES), the detecting unit 75 finishes the response information receiving process. Further, if it is determined in step S601 that the e-mail is not received (step S601, NO), the detecting unit 75 finishes the response information receiving process.

Thus, the sender user is notified that the destination is not associated with the time-limit information and is thereby enabled to take a measure such as directly conveying the reply time-limit to the destination user (recipient user).

Figure 15:
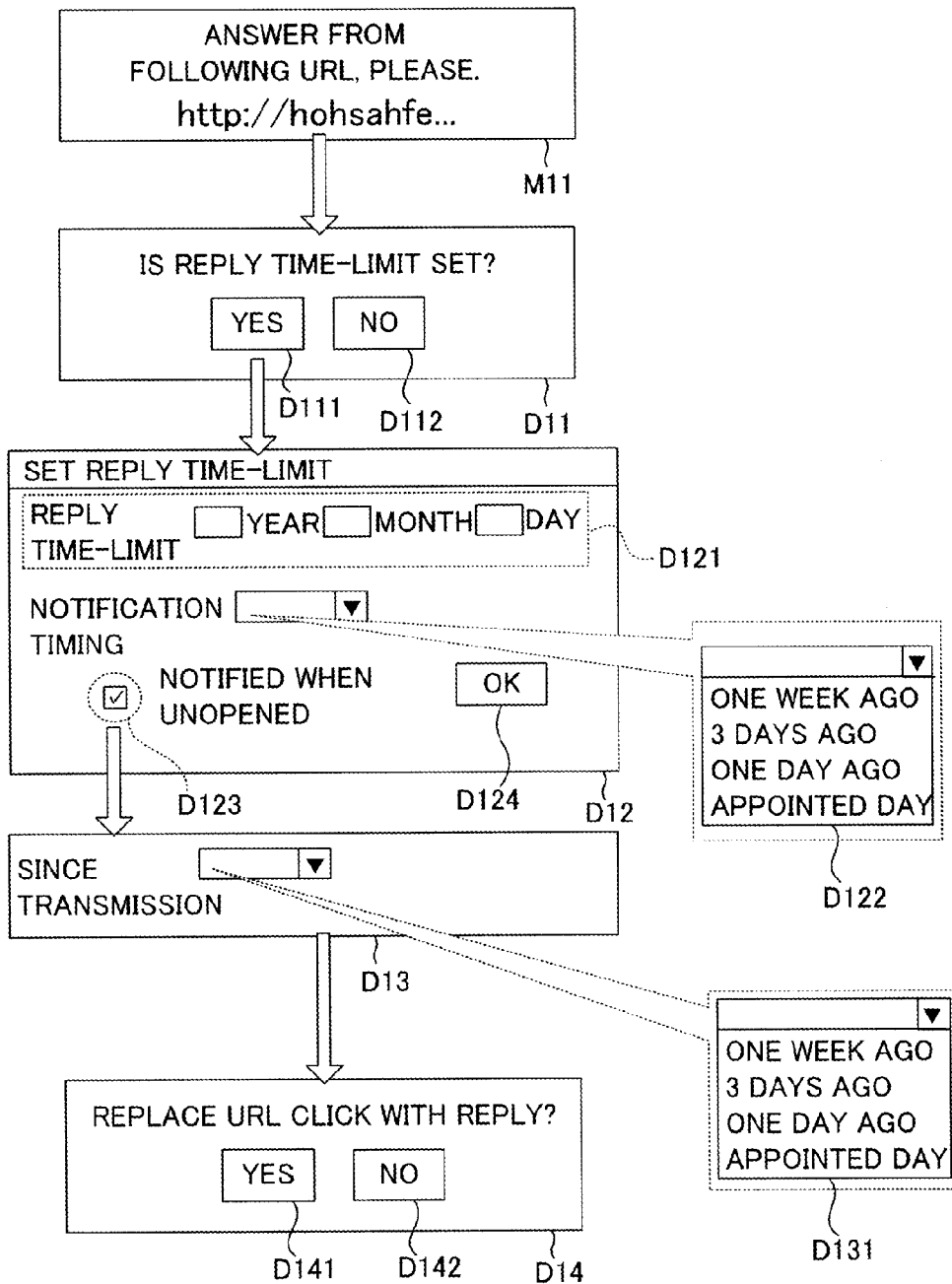
FIG. 15 is an explanatory diagram of a method of setting the reply time-limit to the e-mail requiring a Web answer in the first embodiment.

Note that according to the first embodiment, the reply time-limit can be set in the e-mail requiring a Web reply. The way of how the reply time-limit is set in the e-mail requiring the Web reply will hereinafter be described with reference to FIG. 15.

In the case of making a transmission in response to an e-mail M11 containing a URL (Uniform Resource Locator) in its content, a dialog box D14 accepting an instruction about whether a click on the URL is set as a reply is displayed in addition to the dialog boxes D11-D13 described above. Herein, a selection button D141 on the dialog box D14 is selected, thereby adding the information indicating that the e-mail requires the Web reply to the time-limit information. The storage control unit 76 of the information processing apparatus 2, which receives the e-mail attached with this time-limit information, deletes the time-limit information when the URL on the e-mail is clicked.

Note that the time-limit information is set as the text data attached to the e-mail in the first embodiment, however, the time-limit information is sufficient if being the data transmitted by use of the e-mail. The data transmitted by use of the e-mail is exemplified such as a header of the e-mail, a specified character string within the text of the e-mail and a file linked to the e-mail. Furthermore, the technology described above may be realized by way of a Web mail.

(Second Embodiment)

Figure 16:
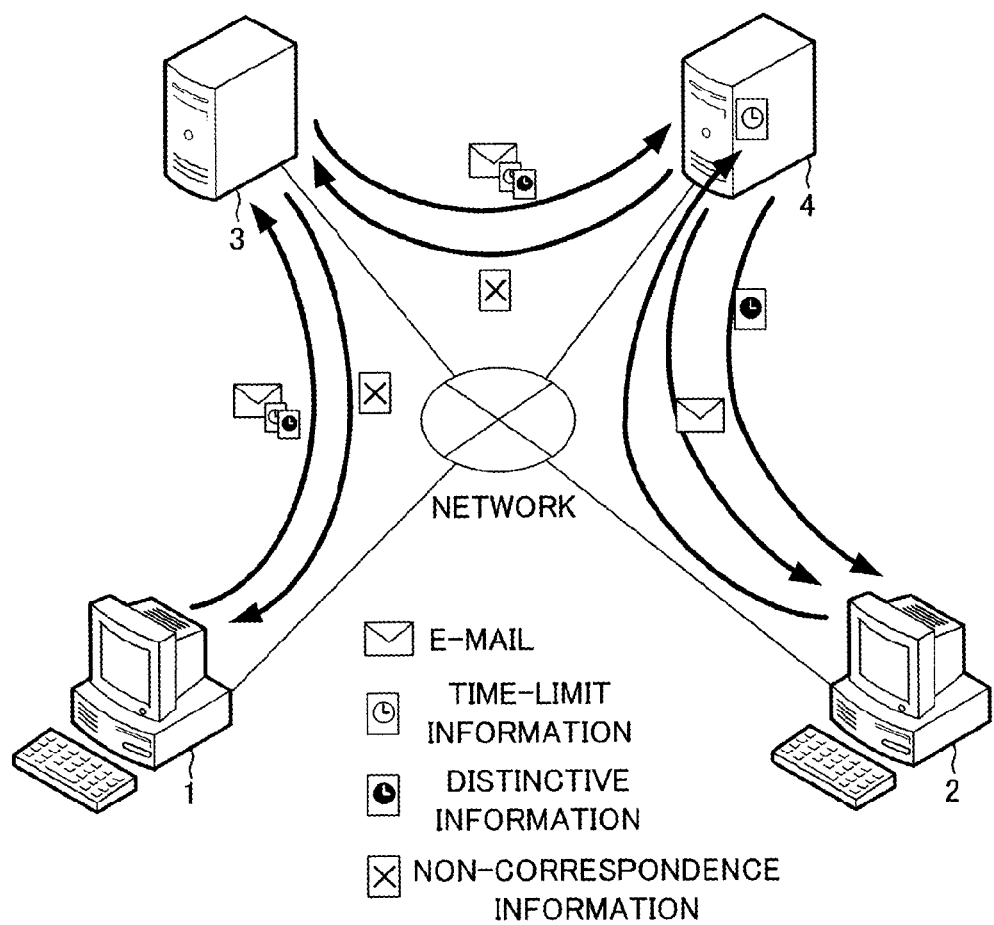
FIG. 16 is a schematic diagram illustrating an architecture and whole operations of the e-mail system according to a second embodiment.

In the first embodiment discussed above, the information processing apparatus as the destination (recipient) manages the time-limit information, while the information processing apparatus as the sender determines whether or not the response information is received within the predetermined period of time and thus determines whether or not the information processing apparatus as the destination corresponds to the time-limit information. In a second embodiment, a mail server used by the information processing apparatus as the destination manages the time-limit information, and notifies the information processing apparatus as the sender that the information processing apparatus as the destination does not correspond to the time-limit information. Operations of the e-mail system, which are different from the first embodiment, will hereinafter be described with reference to FIG. 16. Note that the architecture of the e-mail system according to the second embodiment is the same as that of the first embodiment, and therefore its description is omitted.

At first, the information processing apparatus 1 transmits the e-mail attached with the time-limit information and distinctive information to the mail server 4 via the mail server 3. The distinctive information indicates that the information processing apparatus 2 as the destination of the e-mail corresponds to the display of the reply time-limit based on the time-limit information. The mail server 4 receiving the e-mail attached with the time-limit information and the distinctive information transmits the time-limit information and the distinctive information to a specified folder of the information processing apparatus 2. Further, the mail server 4 includes the time-limit database 531 in the storage unit 53 on an account-by-account basis, and adds the time-limit information attached to the received data to the time-limit database 531. Herein, if the distinctive information cannot be transmitted to the information processing apparatus 2, the mail server 4 determines that the information processing apparatus 2 does not correspond to the display of the reply time-limit based on the time-limit information. In this case, the mail server 4 transmits, to the information processing apparatus 1 via the mail server 3, a piece of non-correspondence information indicating that the destination (recipient) does not correspond to the display of the reply time-limit based on the time-limit information. The information processing apparatus 1 receiving the non-correspondence information notifies the user of the purport that the destination does not correspond to the display of the reply time-limit based on the time-limit information. Further, the information processing apparatus 2 refers to the time-limit database 531 of the mail server 4 each time the e-mail is received, and, similarly to the first embodiment, displays in the pop-up window the reply time-limit with respect to the e-mail associated with the time-limit information in which the notification date is from the present date onward.

Figure 17:
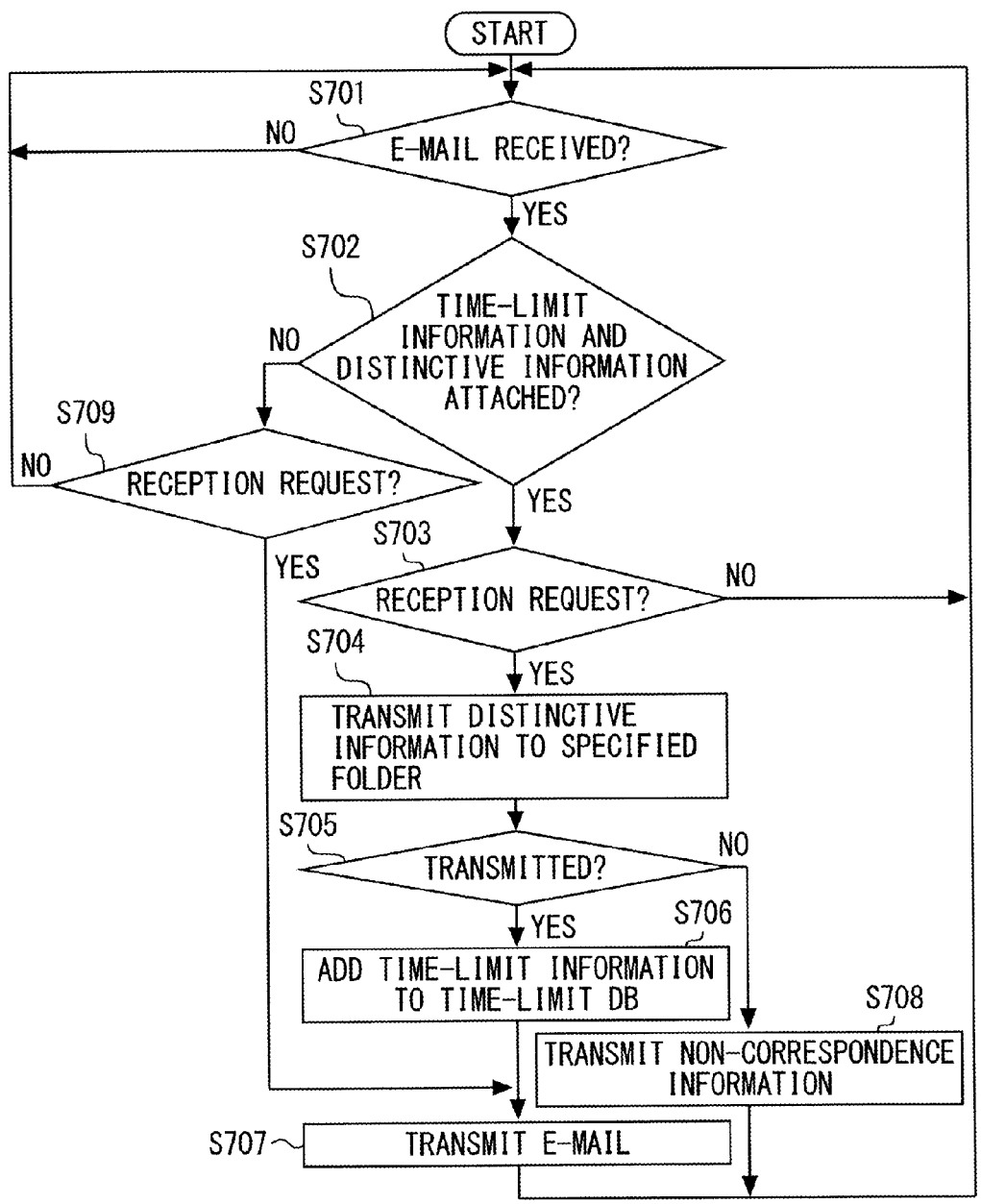
FIG. 17 is a flowchart illustrating an operation of a destination mail server in the second embodiment.

Next, operations of the mail server of the destination according to the second embodiment will hereinafter be described with reference to FIG. 17.

At first, the mail server 4 determines whether the e-mail is received from the information processing apparatus 1 or not (step S701). If the e-mail is received (step S701, YES), the mail server 4 determines whether or not the received e-mail is attached with the time-limit information and the distinctive information (step S702).

If the e-mail is attached with the time-limit information and the distinctive information (step S703), the mail server 4 determines whether a reception request is given from the information processing apparatus 2 or not (step S703). If the reception request is given from the information processing apparatus 2 (step S703, YES), the mail server 4 transmits the distinctive information toward the specified folder of the information processing apparatus 2 (step S704), and determines whether this distinctive information is transmitted to the information processing apparatus 2 or not (step S705).

If the distinctive information is transmitted to the information processing apparatus 2 (step S705, YES), the mail server 4 adds the time-limit information to the time-limit database 531 (step S706) and transmits, to the information processing apparatus 2, the e-mail addressed to the information processing apparatus 2 (step S707). Whereas if the distinctive information is not transmitted to the information processing apparatus 2 (step S705, NO), the mail server 4 transmits the non-correspondence information to the information processing apparatus 1 via the mail server 3 (step S708). Next, the mail server 4 transmits, to the information processing apparatus 2, the e-mail addressed to the information processing apparatus 2 (step S707).

Moreover, if it is determined in step S703 that the reception request is not given from the information processing apparatus 2 (step S703, NO), the mail server 4 again determines whether the e-mail is received from the information processing apparatus 1 or not (step S701). If it is determined in step S702 that the e-mail is attached with neither the time-limit information nor the distinctive information (step S702, NO), the mail server 4 determines whether the reception request is given from the information processing apparatus 2 or not (step S709).

If the reception request is given (step S709, YES), the mail server 4 transmits, to the information processing apparatus 2, the e-mail addressed to the information processing apparatus 2 (step S707). Whereas if the reception request is not given (step S709, NO), the mail server 4 again determines whether the e-mail is received from the information processing apparatus 1 or not (step S701). Further, if it is determined in step S701 that the e-mail is not received (step S701, NO), the mail server 4 again determines whether the e-mail is received from the information processing apparatus 1 or not (step S701).

Thus, the mail server 4 retains the time-limit information, thereby enabling a quantity of the data stored in the storage unit 53 of the information processing apparatus to be reduced. Further, the mail server 4 transmits the non-correspondence information to the information processing apparatus 1, thereby decreasing the load on the process of determining whether or not the information processing apparatus 2 corresponds to the display of the reply time-limit based on the time-limit information.

(Third Embodiment)

Figure 18:
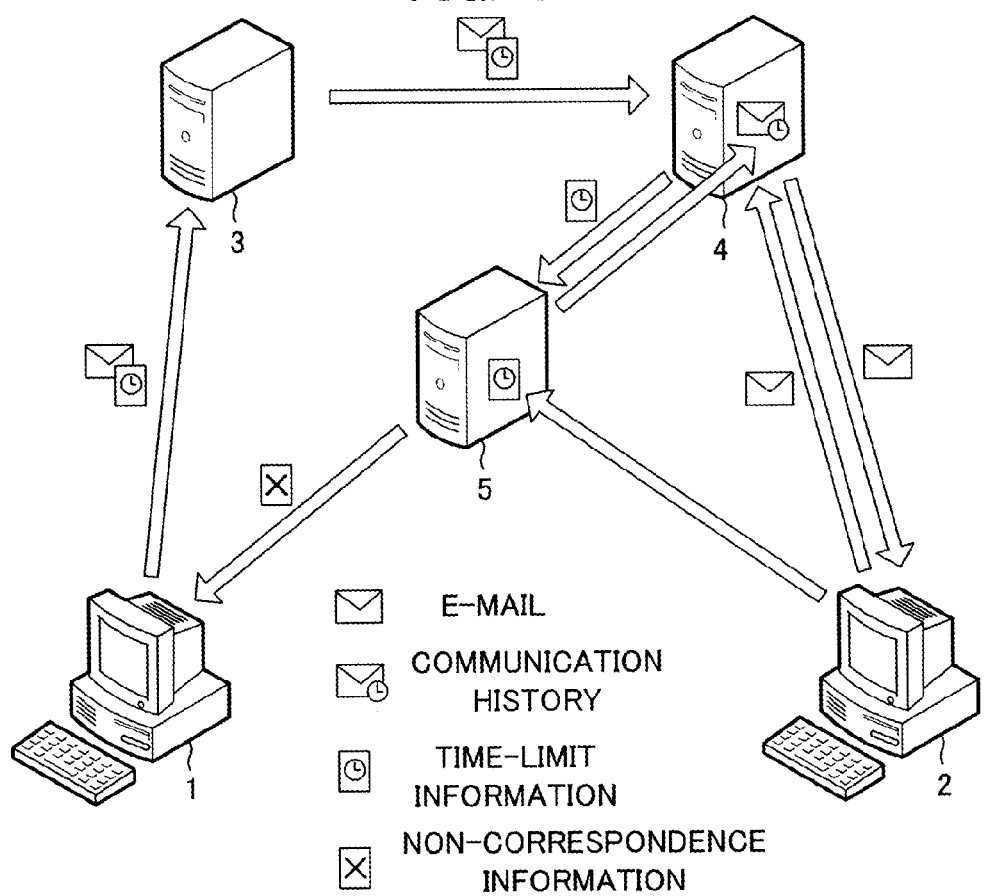
FIG. 18 is a schematic diagram illustrating an architecture and whole operations of the e-mail system according to a third embodiment.

In the second embodiment discussed above, the mail server of the destination (recipient) of the e-mail with the reply time-limit manages the time-limit information. In a third embodiment, the e-mail system includes a management server for managing the time-limit information. Operations of the e-mail system, which are different from those in the second embodiment, will hereinafter be described with reference to FIG. 18.

The e-mail system according to the third embodiment includes a management server 5 in addition to the information processing apparatuses 1, 2 and the mail servers 3, 4, in which these devices are each connected to the network. The management server 5 has the same hardware configuration as the information processing apparatuses 1, 2 and the mail servers 3, 4 have. The information processing apparatus 1 transmits the e-mail attached with the time-limit information to the mail server 4 via the mail server 3. The mail server 4 adds a destination address of the e-mail to the time-limit information attached to the e-mail, then forwards the e-mail to the management server 5, transmits the e-mail to the information processing apparatus 2, receives a reply e-mail in response to the transmitted e-mail, and stores this reply mail as a reply history in the storage unit 53. The management server 5 includes the time-limit database 531 in its storage unit 53 on the account-by-account basis, and adds the time-limit information forwarded from the mail server 4 to the time-limit database 531. In the case of using the setting and the notification of the reply time-limit based on the time-limit information, the e-mail address is registered beforehand in the management server 5. The management server 5, if the e-mail address added to the time-limit information is not registered, transmits the non-correspondence information to the information processing apparatus 1. The information processing apparatus 1 receiving the non-correspondence information notifies the user that the destination does not correspond to the display of the reply time-limit based on the time-limit information. Moreover, the information processing apparatus 2 refers to the time-limit database 531 of the management server 5 each time the e-mail is received and, similarly to the first embodiment, displays in the pop-up window the reply time-limit in response to the e-mail associated with the time-limit information of which the notification date is from the present date onward.

Figure 19:
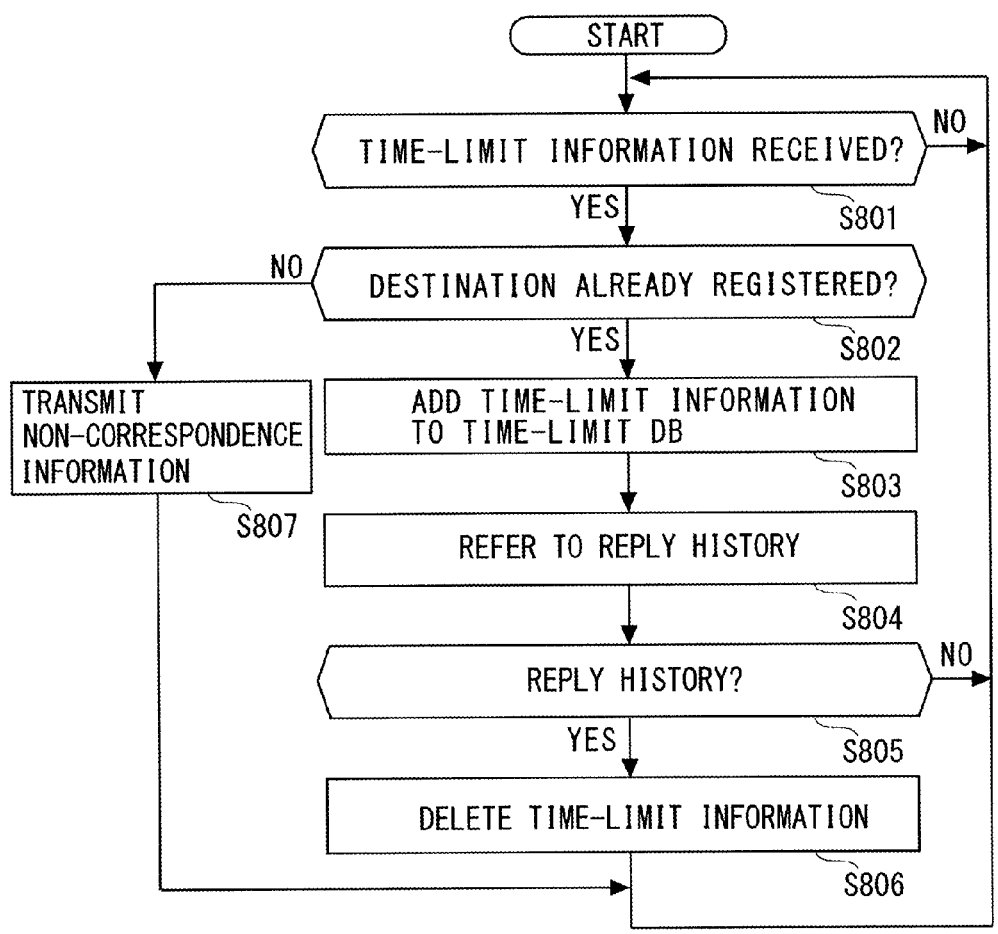
FIG. 19 is a flowchart illustrating an operation of a management server in the third embodiment.

Next, operations of the management server according to the third embodiment will hereinafter be described with reference to FIG. 19.

At first, the management server 5 determines whether the time-limit information is received or not (step S801). If the time-limit information is received (step S801, YES), the management server 5 determines whether the e-mail address of the destination added to the time-limit information is already registered or not (step S802).

If the e-mail address is already registered (step S802, YES), the management server 5 adds the time-limit information to the time-limit database 531 of the corresponding account (step S803). Subsequently, the management server 5 refers to the reply history in the mail server 4 (step S804) and thus determines whether there is any reply to the received time-limit information or not (step S805).

If there is the reply (step S805, YES), the management server 5 deletes the time-limit information from the time-limit database 531 (step S806) and again determines whether the time-limit information is received or not (step S801).

Whereas if there is not the reply (step S805, NO), the management server 5 again determines whether the time-limit information is received or not (step S801).

Moreover, if it is determined in step S802 that the e-mail address is not already registered (step S802, NO), the management server 5 transmits the non-correspondence information to the information processing apparatus 1 (step S807) and again determines whether the time-limit information is received or not (step S801).

Thus, the dedicated server manages the time-limit information, whereby the processing load of the mail server 4 can be reduced. Note that the mail server 4 forwards the time-limit information in the third embodiment, however, the information processing apparatus 2 receives the time-limit information together with the e-mail and may also forward the received time-limit information to the management server 5.

Figure 20:
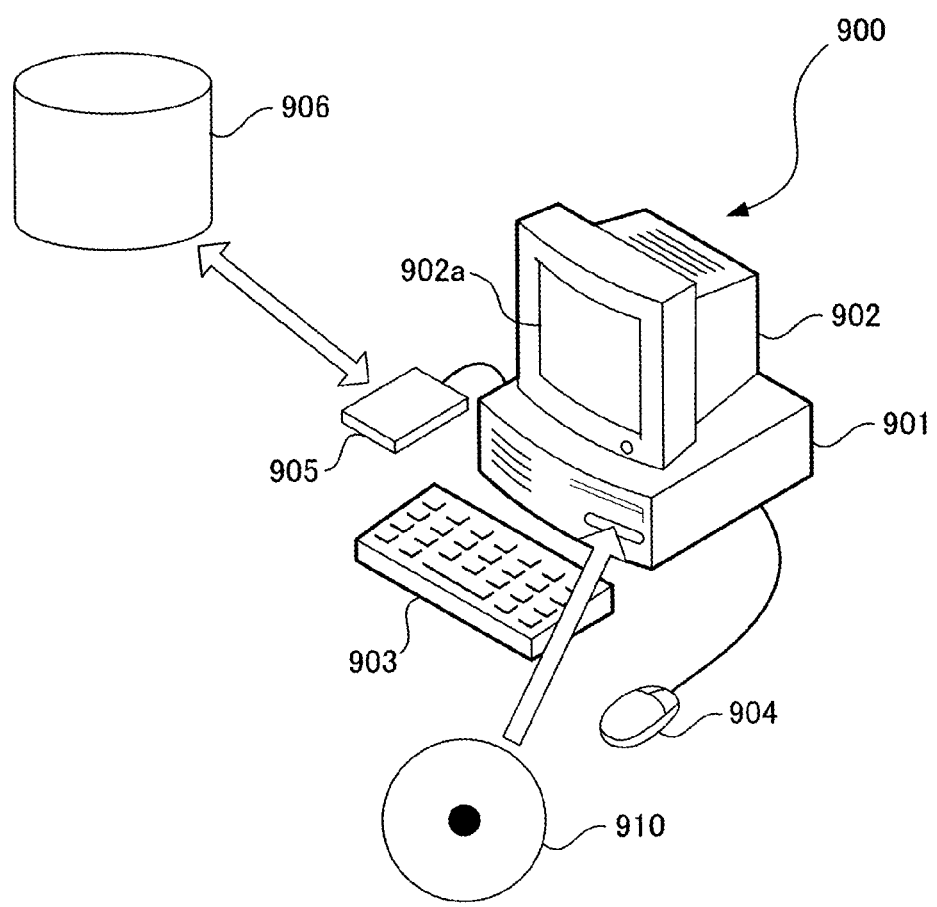
FIG. 20 is a diagram illustrating one example of a computer system to which the technology disclosed in the present specification is applied.

The technology described above can be applied to the computer system that will be given below. FIG. 20 is a view illustrating one example of the computer system to which the technology disclosed in the present specification is applied. A computer system 900 illustrated in FIG. 20 includes a body unit 901 which incorporates a CPU, a disk drive, etc, a display 902 which displays the image in response to an instruction given from the body unit 901, a keyboard 903 for inputting various items of information to the computer system 900, a mouse 904 that specifies an arbitrary position on a display screen 902a of the display 902, and a communication device 905 that downloads programs etc stored in other computer systems by accessing external databases. A network communication card, a modem, etc can be considered as the communication device 905.

A program for getting the respective steps executed in the computer system configuring the information processing apparatus as described above can be provided as a time-limit display program. This program is stored on a recording medium readable by the computer system, thereby enabling the computer system configuring the information processing apparatus to execute the program. The program for getting the respective steps executed is stored on a portable recording medium such as the disk 910 or downloaded by the communication device 905 from a recording medium 906 of another computer system. Further, a time-limit display program (time-limit display software), which provides the computer system 900 with at least a time-limit display function, is inputted to and compiled by the computer system 900. This program makes the computer system 900 operate as the information processing apparatus having the time-limit display function. Moreover, this program may be stored on a computer-readable recording medium such as the disk 910. Herein, the recording medium readable by the computer system 900 includes a variety of recording mediums accessible from the computer system connected via a communication means such as the communication device 905, these recording mediums being exemplified by an internal storage device such as a ROM (Read Only Memory) and a RAM (Random Access Memory) mounted inside the computer, a portable recording medium such as the disk 910, a flexible disk, a DVD disk, a magneto-optic disk and an IC card, a database or another computer system and the database thereof, which each retain the computer program.

Further, the technology described above can be also realized by a system, i.e., a so-called Web mail system that transmits, receives and displays the e-mail by use of a browser running on the computer system. In the case of the Web mail system, the computer system on which the browser runs, a Web server that supplies the e-mail data to the browser, or the management server as in the third embodiment may all be configured to execute the program described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. An information processing apparatus comprising a hardware processor configured to:
    receive data transmitted via a plurality of electronic mails;
    detect time-limit information representing reply time-limits of the plurality of electronic mails from the received data;
    display the plurality of electronic mails;
    display the reply time-limits in the way of being associated with the plurality of displayed electronic mails on the basis of the time-limit information and the present date-time;
    store the detected time-limit information in a memory in the way of being associated with the plurality of electronic mails;
    display a folder to which the plurality of electronic mails stored in the memory belongs in a window opened on a screen; and
    display the reply time-limit closest to the present date-time in the reply time-limits
    displayed in the way of being associated with the plurality of electronic mails within the folder in a pop-up window in front of the window in a way that is associated with the folder.

2. The information processing apparatus according to claim 1, wherein the time-limit information further indicates notification timing of the reply time-limits, and
    the processor, when the present date-time is from the notification timing of the reply time-limits onwards, displays the reply time-limits in the way of being associated with the plurality of displayed electronic mails.

3. The information processing apparatus according to claim 1, wherein the processor:

reads, from the memory, the plurality of electronic mails stored in the memory and the time-limit information associated with the plurality of electronic mails, and deletes, when the electronic mail associated with the time-limit information is replied, the time-limit information from the memory.

4. The information processing apparatus according to claim 1, wherein the processor sorts out the plurality of displayed electronic mails in an ascending or descending sequence on the basis of the reply time-limits.

5. A non-transitory computer readable recording medium having stored therein a program for causing a computer to execute a time-limit display process comprising:

detecting time-limit information representing reply time-limits of a plurality of electronic mails from data received via the plurality of electronic mails;

displaying the plurality of electronic mails;

displaying the reply time-limits in the way of being associated with the plurality of displayed electronic mails on the basis of the time-limit information and the present date-time;

storing the detected time-limit information in a memory in the way of being associated with the plurality of electronic mails;

displaying a folder to which the plurality of electronic mails stored in the memory belongs in a window opened on a screen; and displaying the reply time-limit closest to the present date-time in the reply time-limits displayed in the way of being associated with the plurality of electronic mails within the folder in a pop-up window in front of the window in a way that is associated with the folder.

6. The non-transitory computer readable recording medium having stored therein the program according to claim 5, wherein the time-limit information further indicates notification timing of the reply time-limits, and when the present date-time is from the notification timing of the reply time-limits onwards, the reply time-limits are displayed in the way of being associated with the plurality of displayed electronic mails on the occasion of displaying the time-limits.

7. The non-transitory computer readable recording medium having stored therein the program according to claim 5, the time-limit display process further comprising:

reading the plurality of electronic mails from the memory on the occasion of displaying the plurality of electronic mails;

reading the time-limit information associated with the plurality of electronic mails from the memory on the occasion of displaying the reply time-limits; and deleting, when the electronic mail associated with the time-limit information is replied, the time-limit information associated with the replied electronic mail from the memory.

8. The non-transitory computer readable recording medium having stored therein the program according to claim 5, the time-limit display process further comprising sorting out the plurality of displayed electronic mails in an ascending or descending sequence on the basis of the reply time-limits.

9. A time-limit display method comprising:

making a first information processing apparatus transmit data containing time-limit information representing reply time-limits of a plurality of electronic mail via the plurality of electronic mails; and making a second information processing apparatus receive the data transmitted via the plurality of electronic mails, detect the time-limit information from the received data, display the plurality of electronic mails, display the reply time-limits on the basis of the time-limit information and the present date-time in the way of being associated with the plurality of displayed electronic mails and store the detected time-limit information in a memory in the way of being associated with the plurality of electronic mails, wherein the second information processing apparatus displays a folder to which the plurality of electronic mails stored in the memory belongs in a window opened on a screen, and the reply time-limit closest to the present date-time in the reply time-limits displayed in the way of being associated with the plurality of electronic mails within the folder is displayed in a pop-up window in front of the window in a way that is associated with the folder.

10. The time-limit display method according to claim 9, wherein the time-limit information further indicates notification timing of the reply time-limits, and when the present date-time is from the notification timing of the reply time-limits onwards, the reply time-limits are displayed in the way of being associated with the plurality of displayed electronic mails on the occasion of displaying the reply time-limits.

11. The time-limit display method according to claim 9, wherein the second information processing apparatus further displays the plurality of electronic mails stored in the memory, the plurality of electronic mails is read from the memory on the occasion of displaying the plurality of electronic mails, the time-limit information associated with the plurality of electronic mails is read from the memory on the occasion of displaying the reply time-limits, and the second information processing apparatus further deletes, when the electronic mail associated with the time-limit information is replied, the time-limit information associated with the replied electronic mail from the memory.

12. The time-limit display method according to claim 9, wherein the second information processing apparatus sorts out the plurality of displayed electronic mails in an ascending or descending sequence on the basis of the reply time-limits.

13. The time-limit display method according to claim 9, wherein the second information processing apparatus further transmits, when determining that the received electronic mail contains the time-limit information, response information representing that the time-limit information is received to the first information processing apparatus via the electronic mail, and the first information processing apparatus further receives the transmitted data via the electronic mail and, when the response information is not detected from the received data within a predetermined period of time since the electronic mail containing the time-limit information has been transmitted, notifies a user of a purport that the second information processing apparatus does not correspond to the display of the reply time-limits.

* * * * *